Feb. 25, 1930.  A. J. MAY  1,748,298
ELECTRIC CIRCUIT CONTROL MEANS
Filed March 12, 1927  5 Sheets-Sheet 1
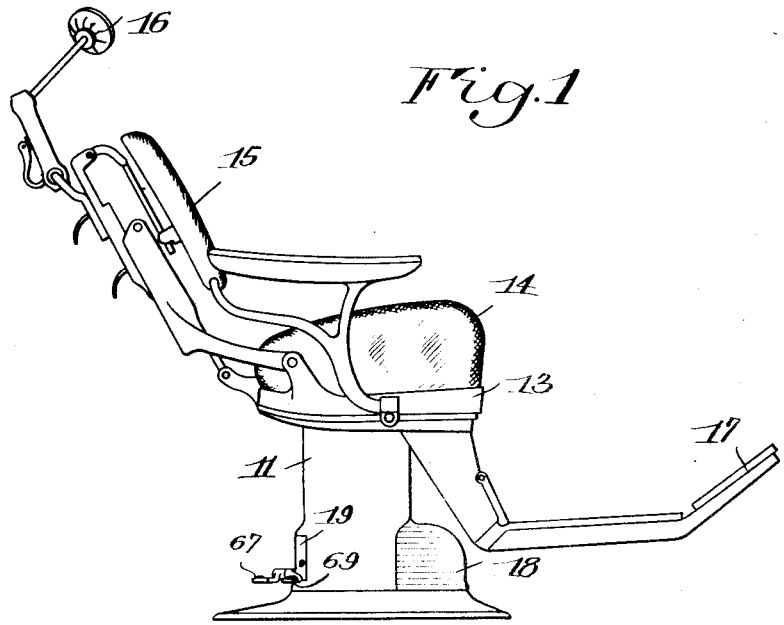
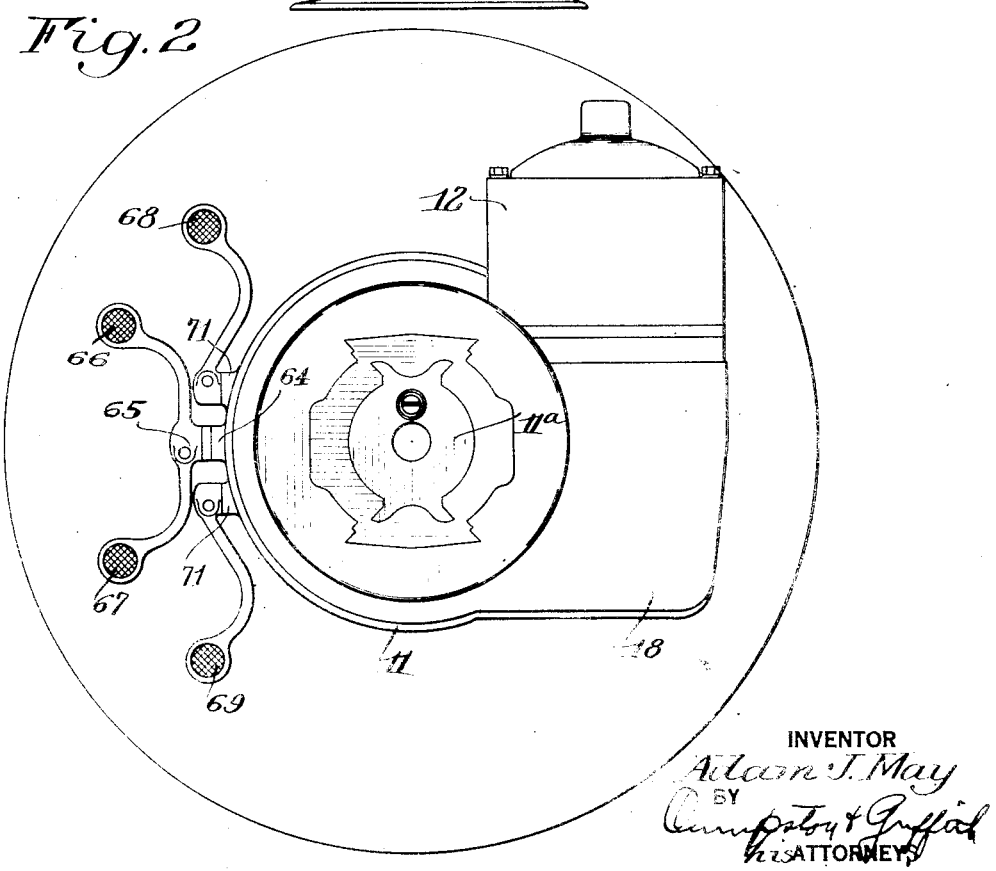
INVENTOR
Allan J. May
BY
ATTORNEYS

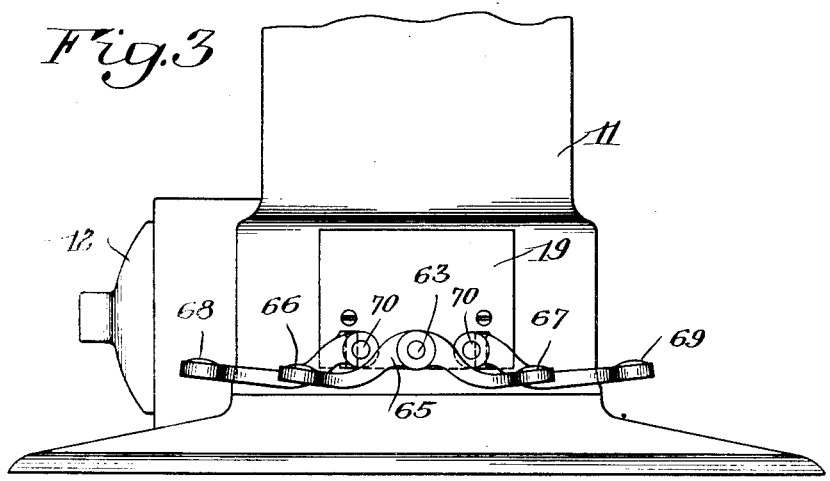
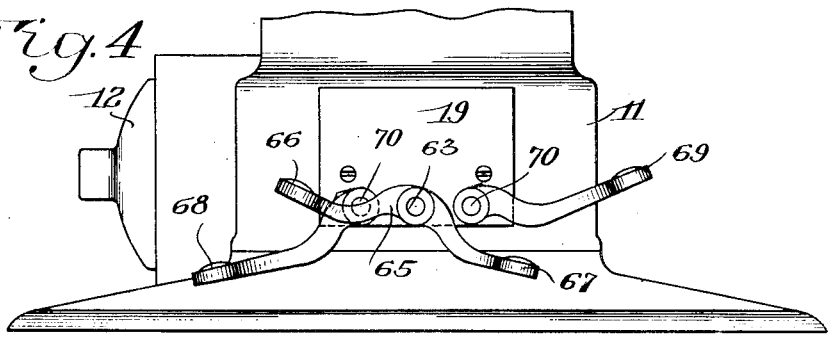
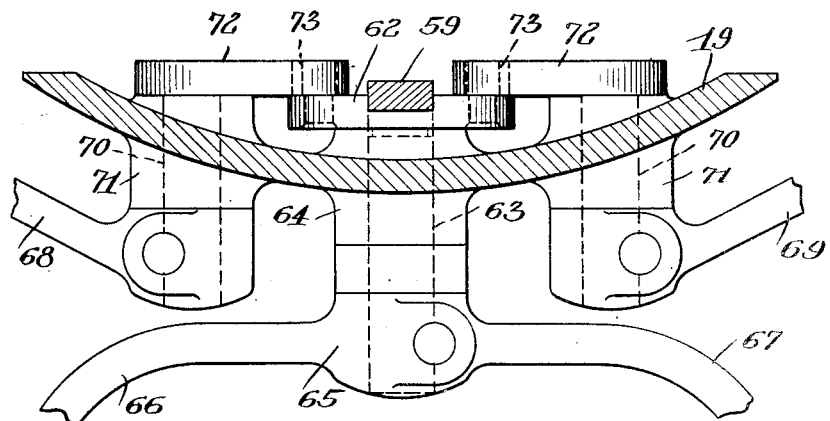

Feb. 25, 1930.  A. J. MAY  1,748,298
ELECTRIC CIRCUIT CONTROL MEANS
Filed March 12, 1927  5 Sheets-Sheet 3
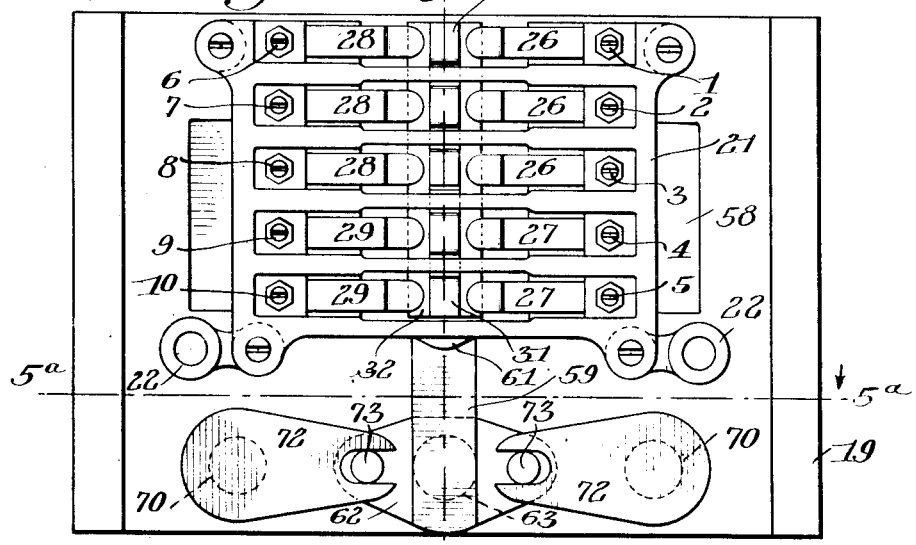
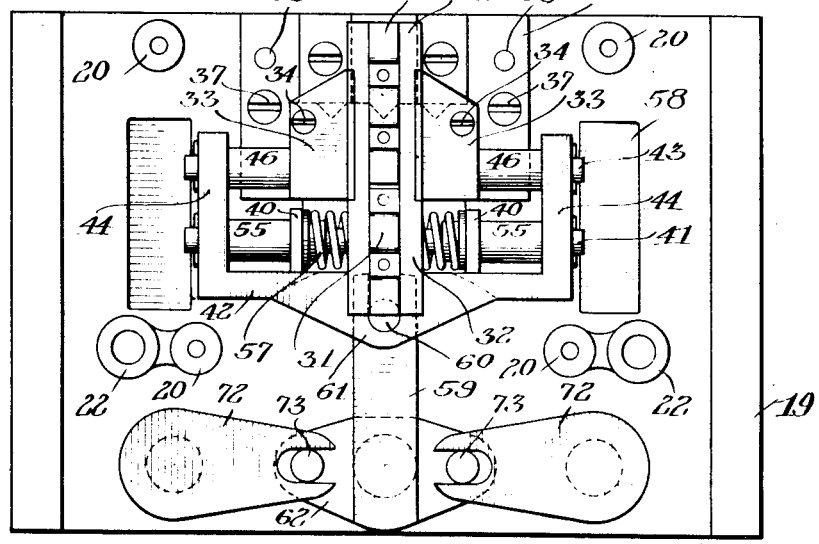
INVENTOR
Adam J. May
BY
his ATTORNEYS Feb. 25, 1930.                A. J. MAY                1,748,298
                    ELECTRIC CIRCUIT CONTROL MEANS
                    Filed March 12, 1927        5 Sheets-Sheet 4
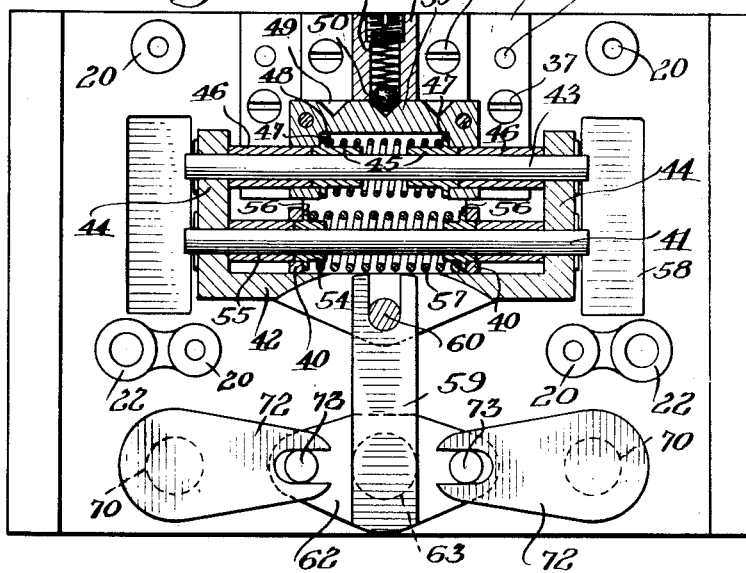
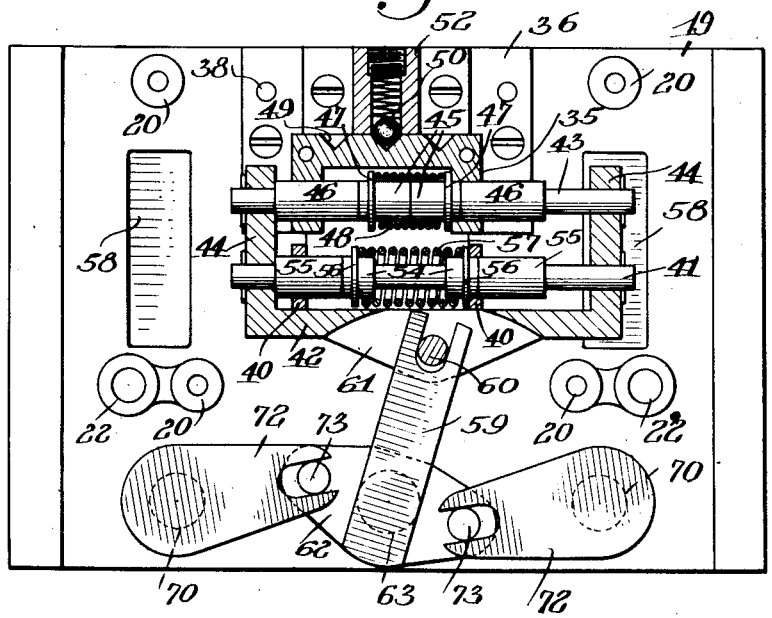
INVENTOR
Adam J. May
BY
Crumpton & Griffith
his ATTORNEYS

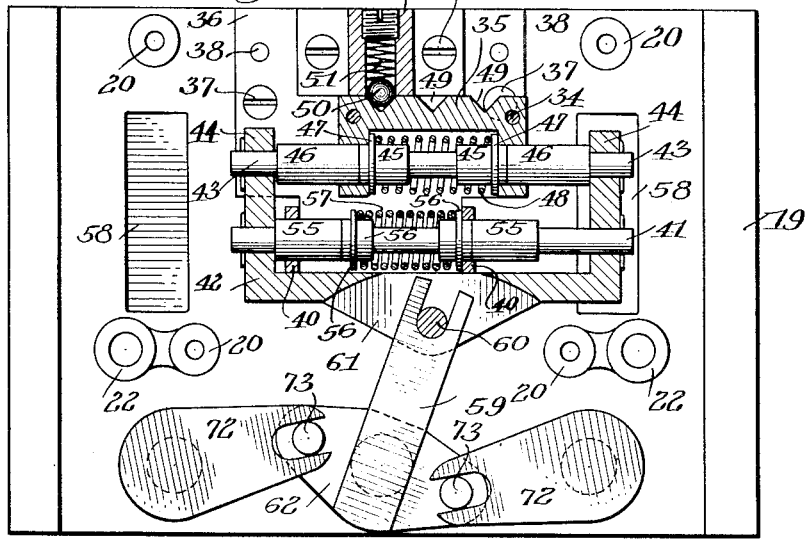
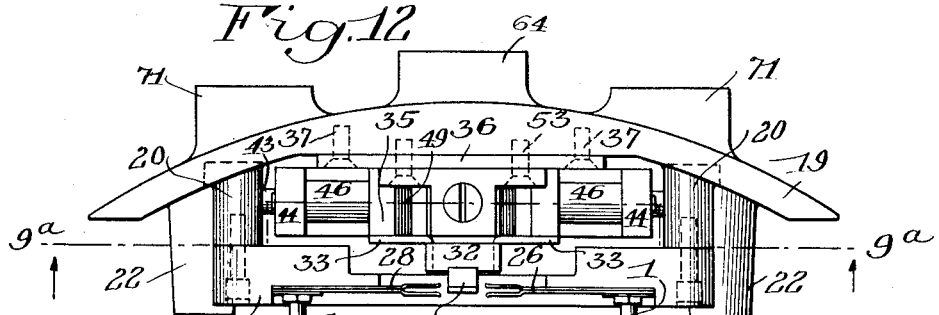
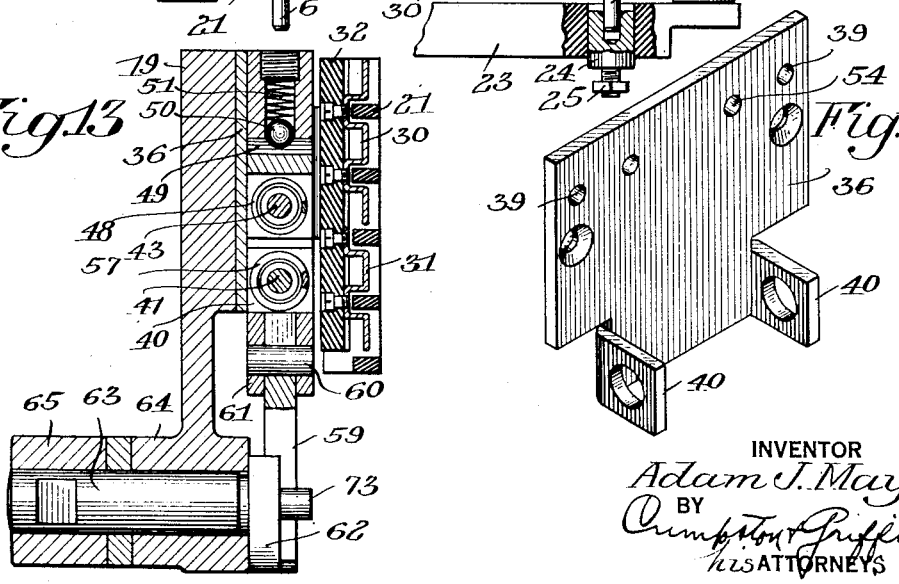

Patented Feb. 25, 1930

1,748,298

UNITED STATES PATENT OFFICE

ADAM J. MAY, OF ROCHESTER, NEW YORK, ASSIGNOR, BY MESNE ASSIGNMENTS, TO RITTER DENTAL MANUFACTURING COMPANY, INC., OF ROCHESTER, NEW YORK, A CORPORATION OF DELAWARE

ELECTRIC-CIRCUIT-CONTROL MEANS

Application filed March 12, 1927. Serial No. 174,903.

The present invention relates to electric circuit control means and has for its object to provide more particularly improved means of this class adapted for controlling the operation of an electric motor for raising or lowering extensible chair sections or the like.

A further object of the invention is to provide an improved electric switch for use in controlling one or more electric circuits employed in connection with a reversible electric motor or other electrically driven means, such for example, as may be employed for raising dental, surgical, barbers' and other types of extensible chairs.

A further object of the invention is to provide an improved electric reversing switch embodying a reversible contact holder or carrier and spaced sets of operating elements connected therewith and so arranged as to permit the operator to effect complete operation of the switch from two or more points.

A further object of the invention is to provide an improved electric switch having yieldable means adapted under initial operation of the switch actuating parts to store up energy which will afford a quick movement of the adjustable switch contact upon continued movement of the parts whereby to prevent arcing either upon openng or closing the switch.

A further object of the invention is to provide an improved type of electric switch for a reversible motor employed in the operation of extensible chairs and the like and having a plurality of operating elements embodying two or more sets of spaced actuators so arranged with respect to the chair base as to be operated from opposite or different sides thereof whereby either set may be employed for reversing the motor circuit to effect raising or lowering of the chair, depending upon the particular position of the operator at a given time of operation.

To these and other ends the invention resides in certain improvements and combinations of parts, all as will be hereinafter more fully described, the novel features being pointed out in the claims at the end of the specification.

In the drawings:

Figure 1 is a side elevation of an extensible chair to which the invention is applied;

Figure 2 is a plan view of the chair base drawn to an enlarged scale, the chair proper being removed to show the arrangement of pedals or actuators for controlling the switch;

Figure 3 is a side elevation of the base showing the pedals in normal inoperative position;

Figure 4 is a similar view showing the position of the pedals when one is moved to operate the switch;

Figure 5 is a fragmentary sectional plan taken on line 5ª—5ª of Figure 6;

Figure 6 is an elevation as viewed from the lower side of Figure 12 with the inner socket plate removed;

Figure 7 is a similar elevation with the support for the fixed contacts removed;

Figure 8 is a detailed perspective view of the spring actuated holder shown at one side of its central position in Figure 11;

Figure 9 is a sectional elevation taken on line 9ª—9ª of Figure 12 with the movable contact holder and carrier therefor in central or open position;

Figure 10 is a similar section with the carrier moved to the right to compress the springs and with the holder in central position;

Figure 11 is a similar section showing the carrier moved slightly further to effect movement of the holder to one of its extreme positions;

Figure 12 is a top plan view of the switch;

Figure 13 is a transverse sectional elevation taken on line 13ª—13ª of Figure 6; and Figure 14 is a detailed perspective view of the guide plate for the carrier and holder.

Similar reference numerals throughout the several views indicate the same parts.

The present invention embodies improvements in electric circuit control means and includes an electric switch adapted particularly for use as a reversing switch for an electric motor such for example as a reversible motor for effecting the up and down movements of an extensible chair. In the case of dental and other extensible chairs the dentist or operator controlling the movements of the chair finds it necessary to frequently change his position from one side of the patient to the other. Heretofore the pedal or actuating member for reversing the switch has been located at one side of the chair only and in such a position as to render it inconvenient or impossible for the operator to actuate the switch without moving from one position to another when desiring to reverse the motor. The present invention is designed to make it convenient and easy for the operator to actuate the switch without changing his position when standing at the back or at either side of the chair.

Referring to the drawings, 11 represents a hollow chair base or casing having one or more extensible sections 11ª adapted to be elevated and lowered by mechanism, not shown, through the medium of a reversible electric motor 12 supported by the base. The chair proper is connected with the extensible sections and preferably includes a base frame 13 on which is supported a seat 14, back 15 and head and foot rests 16 and 17 respectively, all of which may be of any approved construction. The base or casing 11 is provided with an extension 18 to which the motor 12 is connected, the extension forming a housing for any suitable chair raising mechanism not shown which is adapted to be driven by the motor.

The present switch, as before stated, embodies a reversing switch for the motor and is designed to be connected up with an automatic limit switch, not shown, for breaking the motor circuit when the chair is moved to certain predetermined positions, the switch and circuit arrangements being preferably as shown and described in my copending application for extensible chairs, Serial No. 70,241, filed November 20, 1925. However, the present switch may be employed in other types of chairs than that shown or in connection with various operating mechanisms where its use may be found advantageous.

The base or casing 11 is provided preferably at its rear side with a junction box or pocket which is closed by a cover plate 19 forming a support or base for the switch as shown in Figure 12. The plate 19 is provided with a plurality of boss-like projections 20 to which is suitably secured a plate of insulating material 21 as shown in Figures 6 and 12. The support 19 also carries boss-like extensions 22 to which is suitably secured a second plate 23 of insulating material opposite the plate 21. The plate 23 carries a series of socket members 24 having binding posts 25 for the various wires, not shown, which serve to connect the present switch with the motor and with the limit switch, preferably in the manner disclosed in my copending application referred to above. The socket members at one end of the plate 23 are adapted to receive a series of plugs 1 to 5 inclusive as shown in Figure 6, the first 3 of which are carried by fixed contacts 26 on the plate 21 and the other two by fixed contacts 27 on said plate. Likewise sockets on the left hand end of the plate 23 are adapted to receive the plugs 6 to 10 inclusive, the first three of which are carried by fixed contacts 28 on the plate 21 and the other two by fixed contacts 29 on said plate as also shown in Figure 6. The fixed contacts are preferably forked at their inner ends, the two sets 26 and 28 being adapted to receive the opposite portions of an upper contact member 30 mounted between said ends while the two sets 27 and 29 are adapted to receive like portions of a lower contact member 31 which is insulated from the upper contact 30. The contact members 30 and 31 are carried on a strip 32 of insulating material disposed at one side of the plate 21 and suitably connected to a pair of angle brackets 33 which in turn are connected by screws 34, Fig. 7 to a block 35 forming a quick actuated holder for the movable contacts 30 and 31 as will be hereinafter pointed out.

A bracket 36, Figure 14, is secured to the inner face of the base or cover 19 by screws 37 and is held in proper position by a pair of dowel pins 38 projecting in holes 39 of the bracket. The bracket carries a pair of laterally projecting lugs 40 bored to receive a rod 41 forming a support or guide for a carrier 42 which is provided with a second rod 43 by which the contact holder 35 is slidably supported as shown in Figure 9.

The carrier 42 has upstanding end portions 44 in which the ends of the rods 41 and 43 are supported, the latter being extended through the spaced ends of the contact holder 35 which are bored to a larger diameter than that of the rod to receive the followers 45 thereon and the sleeves 46, forming in effect a continuation of the followers and having their outer ends abutting the inner faces of the end portions 44 of the carrier as shown in Figure 9. The followers 45 are provided with shoulders or flanges 47 which abut the inner faces of the ends of the holder 35. A spring 48 surrounds the rod 43 and has its opposite ends engaging the flanges of the followers and serves to hold the followers in the position shown in Figure 9 when the switch is in normal open position. The contact holder 35 is provided on its upper side with a series of notches or grooves 49 adapted to receive a detent, preferably a ball 50, which is yieldably held within the grooves by a spring 51 carried by a holder 52 suitably secured to the bracket 56 preferably by screws 53. The bottom of the holder 52 is preferably adapted to form a guide for the contact holder 35 when the latter is moved from one position to another. The lower rod 41 extends through the lugs 40 of the bracket 36 and carries a pair of followers 54 and sleeves 55 which move in the lugs when the carrier is shifted from one position to another. The followers 54 are provided with flanges or abutments 56 which receive the ends of a spring 57 surrounding the rod 41 between the lugs 40, the latter serving to prevent movement of the followers in an outward direction but permitting them to be moved inwardly by the sleeves 55 to compress the spring 57 as shown in Figure 10. The base 19 is recessed at 58 to afford clearance for the ends of the carrier when in its extreme positions.

Operation of the carrier to effect opening and closing of the switch is afforded by a pivoted arm 59, the upper end of which projects into a recessed portion of the carrier and is preferably forked to receive a pin 60 the opposite ends of which are secured in downwardly extending lugs 61 on the carrier as shown in Figure 13. The arm 59 is rigid on a lever 62 having operating portions extending on opposite sides of the arm. The lever is rigid on the inner end of a pin or pivot member 63 journaled in a bearing 64 of the base 19. A pedal or actuator 65 having oppositely extending arms or actuating portions 66 and 67 is fixed on the outer end of the pivot member to afford a primary actuator for moving the switch to and from its different circuit control positions when the dentist or operator is standing at the back of the chair or at a point from which he can conveniently place his foot on either of said portions without changing his position relative to the chair base. Projecting to the sides of the chair on opposite sides of the actuator 65 are spaced secondary actuators 68 and 69, preferably in the form of single arm pedals.

The inner end of the actuator 68 is rigid on a pivot member 70 journaled in a bearing 71 on the switch base 19 and carrying an arm 72 forked at its inner end to receive a pin 73. The opposite actuator 69 is similarly connected with the lever 62 by like parts designated by the same reference characters and operates in the same manner, each single pedal or actuator forming a complement to one arm of the primary actuator 65.

An important feature in the operation of the movable contact holder 35 is that a positive action of the same is afforded after a predetermined pressure has been built up in the spring 48. In other words the followers 45 are made to contact as shown in Figure 10, slightly before the spring 48 is compressed sufficiently to overcome the resistance of the spring pressed ball 50, so that the holder 35 will begin to move under the positive action of the followers and will be initially displaced by the latter. Immediately following such displacement the spring 48 will afford a quick movement of the holder, following which the spring pressed detent will move into one of the notches of the holder to arrest the movement of the latter.

Heretofore the springs have been depended on to effect initial movement of the holder and, due to the impracticability of producing springs all of which have the same capacity for the same amount of compression, it has not been satisfactory to rely on the same for uniform and satisfactory results since in the operation of the different switches the extent of movement of the pedal has necessarily varied and in some instances its extreme movement has been insufficient to cause the spring to effect operation of the contact holder. This difficulty is of course overcome with the present means which affords a positive initial movement of the contact, followed by a quick movement through the action of the spring.

In operating the switch for the back of the chair and using the primary actuator alone the operator will depress the pedal 66 to move the carrier which causes the followers at the left hand end thereof as viewed in Figure 9, to compress the springs 48 and 57, the former against the resistance of the spring pressed detent or ball 50 and the latter against the resistance of the right hand lug 40 of the bracket 46 as shown in Figure 10. From the position shown in this figure further depression of the pedal arm 66 will cause the spring 48 to overcome the frictional resistance offered by the ball 50 and holder 35 and the spring 48 will then move the holder to the position shown in Figure 11. This movement of the holder carries the contact members 30 and 31 thereon into engagement with the two sets of fixed contacts 26 and 27 respectively which carry or are connected with the socket plugs 1 to 5 inclusive, thus starting the motor to effect raising or lowering of the extensible chair section as the case may be. As soon as the operator removes his foot from the pedal the spring 57 will return the carrier to normal central position causing the followers on the right hand end of the rod 43 to build up sufficient pressure in the spring 48 to overcome the resistance of the ball and to move the contact holder 35 back to central position whereby the motor circuit is broken.

It will be understood that the parts will be actuated in the same manner upon depressing either arm of the actuator 65, the only difference being that in one case the extensible chair section will be raised and in the other, lowered, depending upon which set of fixed contacts the circuits are closed through. Preferably the arrangement will be the same as disclosed in my copending application referred to above.

It will be seen on the opening and closing operations just described that a relatively quick make and break is afforded between the movable and fixed contacts whereby arcing is avoided in the opening and closing of the motor circuits. This is true for any opening or closing position to which the switch may be moved by the several operating pedals or actuators.

In operating the switch from the left side of the chair as viewed in Figures 2 to 5, depression of the pedal 66 will move the carrier from the position shown in Figure 9 to that shown in Figure 11. After release the pedal 66 the carrier and holder thereon will return to the position shown in Figure 9. If then, the operator desires to reverse the motor while still on the left side of the chair so that the extensible chair section will move in a reverse direction he merely depresses the pedal or actuator 68. This raises the inner end of the arm 72 on the right as viewed in Figure 9 and rocks the lever 62 to move the rocker arm 59 to the left or in an opposite direction from that shown in Figure 10. Therefore, as viewed in Figure 5, depression of the actuator 66 will move the rocker arm 59 and carrier 42 to the right while depression of the actuator 68 will move said parts to the left. In one instance, the motor will lift the extensible chair section and in the other it will lower the same. If the operator is on the opposite or right side of the chair, depression of the actuator 67 will cause the extensible chair section to move in the same direction as moved upon depression of the actuator 68 and likewise depression of the actuator 69 will effect the same movement of the chair section as is afforded by depression of the actuator 66. It will be seen therefore that with the operator standing at either side of the chair the two actuators nearest to him can be employed to effect both an up and down movement of the chair, or if his position is at the back of the chair he can use the actuators 66 and 67 to effect said operations. As shown in Figure 4, depression of the actuator 68 effects movement of each of the remaining actuators since they are interconnected through the lever 62 and arms or links 72. This is true with respect to operation of any one of the actuators as they are all interconnected with the carrier and movable contact holder. It will be understood, however, that the particular manner in which they are connected may readily be varied if desired. For example, the arms 72 instead of being connected with the parts 62 and 63 can readily be connected with the ends of the carrier 42 to produce the same results as afforded with the present arrangement.

I claim as my invention:

1. In combination, an electric switch comprising cooperating contact devices, one of which is movable to different control positions and a plurality of operating elements for said movable contact device comprising spaced sets of actuators, the actuators of each set being adapted to effect operation of said movable contact device to its different control positions.

2. In combination, an electric switch comprising cooperating contact devices, one of which is movable to different circuit control positions, an operating member for said movable contact device movable to different positions and a plurality of operating elements interconnected with said member and comprising spaced sets of actuators, the actuators of each set being adapted to effect movement of said operating member to its different positions.

3. In combination, an electric switch comprising spaced contacts and an adjustable contact adapted to be moved to different positions for engagement with said spaced contacts, an actuator for said adjustable contact movable relative thereto and having a plurality of operating portions for moving the adjustable contact to different positions and spaced actuators connected with said adjustable contact one for moving it to one position and another to a different position each of said spaced actuators being manually operable and cooperating with one of the operating portions of the first mentioned actuator to move the adjustable contact to its different positions.

4. In combination, an electric switch comprising relatively movable contact members, an operating member for one of said contact members movable relative thereto and having oppositely projecting actuating portions and spaced actuating members connected with the movable contact member adapted for independent operation and each for cooperation with one of the actuating portions of said operating member whereby to effect operation of the switch from different points.

5. In combination, an electric switch comprising cooperating contact devices, one of which is movable to different circuit control positions, an operating member for shifting the movable contact device to its different control positions, a manually controlled actuator for said member comprising oppositely disposed pedal portions movement of each of which to a predetermined position is adapted to effect movement of said operating member to a different control position and a second actuator spaced from one of said pedal portions and connected with said operating member to effect movement thereof to one of its control positions.

6. In combination, an electric switch comprising cooperating contact devices, one of which is movable to different control positions, a holder for shifting said movable contact device to said positions, a member adapted to be moved in different directions for moving said holder to its different control positions, an actuator operatively connected with said member for moving it to one control position, a second actuator movable relative to the first and means operatively connecting the second actuator with said member to effect movement of the holder to its other control position.

7. In combination, an electric switch comprising cooperating contact devices, one of which is movable to different control positions, an oscillatory element operatively connected with said movable contact device and movable relative thereto, an actuator connected with said element having oppositely extending portions manually movable to effect operation of said element in different directions and a pair of spaced manually operable actuators movable relative to the first mentioned actuator and each connected with said element one to effect movement thereof in one direction and the other in an opposite direction, each actuator of said pair and one of said actuator portions being adapted to effect movement of the element in opposite directions.

8. In combination, an electric switch comprising a support, spaced contacts fixed upon the support, means reciprocally mounted upon the support adjacent the contacts, a contact carried by said means and movable therewith to and from engagement with said fixed contacts, means by which to effect a relatively quick movement of the contact carrying means in opposite directions when moved to predetermined positions and a plurality of operating elements for said contact carrying means comprising spaced sets of manually operable actuators, the actuators of each set being adapted to effect operation of said contact carrying means to its different control positions.

9. In combination, an electric switch comprising a support, spaced contacts thereon, a member movable upon the support, a holder movable relative thereto and having a contact for engagement with said spaced contacts, the holder being movable to different positions at which its contact is adapted to engage said spaced contacts, a spring for moving the holder to said positions, means for moving said member to different positions in each of which it is adapted to compress the spring and relatively movable spaced actuators for said member.

10. An electric switch comprising a base, relatively movable contact devices thereon, one of which is movable to and from circuit closing position, a pivoted element for actuating said movable device arranged to move relative thereto, a primary actuator connected with said element and including a plurality of operating portions for moving said member in opposite directions, manually operable secondary actuators associated one with each of said operating portions each secondary actuator forming an operating complement to one of said operating portions and means directly connecting each secondary actuator with said element.

11. An electric switch comprising a base, relatively movable contact devices thereon, one of which is movable to and from closing position, an actuating element for said movable contact device, a primary actuator operatively connected with and movable relative to said element for shifting it to its different positions and spaced manually operable secondary actuators pivotally connected with said element and each forming an operating complement to said primary actuator, whereby the switch may be operated from different points.

12. An electric switch comprising a base, relatively movable contact devices thereon, one of which is reversible, an actuator operatively connected with said reversible device for moving it in opposite directions, spaced actuators each adapted for moving the reversible contact device in a different direction and spring means for effecting a relatively quick movement for said reversible contact device when moved to predetermined positions by said actuators.

13. An electric switch comprising a base, contact members thereon, one of which is reversible, an operating element for said reversible contact movable relative thereto and separately mounted manually operable interconnected actuators for operating said element each adapted to move it in a different direction.

14. An electric switch comprising a base, contact members thereon, a reversible holder for one of said contacts, separately mounted actuators interconnected with said holder and adapted each to effect movement of the holder in a different direction and spring means for effecting a relatively quick movement of said holder when moved to predetermined positions by said actuators.

15. In an electric switch, a support, a contact thereon, a member reciprocally mounted upon the support, a holder movable relative to said member and having a contact movable therewith to and from engagement with the first mentioned contact, means for resisting movement of the holder during movement of said member, means adapted to be moved by said member for effecting a positive movement of the holder when the member is moved beyond a predetermined position, means associated with the last mentioned means for effecting a relatively quick movement of the holder when positively moved by said member and means for reciprocating said member.

16. In an electric switch, a support, a contact thereon, a carrier reciprocally mounted upon the support, a holder movable upon the carrier and having a contact movable therewith to and from engagement with the first mentioned contact, yieldable means for retaining the holder in predetermined positions during movement of the carrier to a predetermined point in either direction, movement of the carrier beyond said points serving to positively effect movement of the holder against resistance of the yieldable retaining means, yieldable actuating means for moving the holder in opposite directions following movement thereof by the carrier and means for moving the carrier in opposite directions.

17. In an electric switch, a support, a contact thereon, a carrier, a holder upon the carrier adapted for movement relative thereto, means adapted to afford a predetermined degree of resistance to movement of the holder, a contact upon the holder adapted when the latter is moved to a predetermined position to engage the first mentioned contact, yieldable means adapted to be conditioned by movement of the carrier to effect movement of the holder thereon when the carrier is moved to a predetermined position, an element connected with the carrier for moving it in opposite directions and separate manually controlled operating members for said element by which to move it in different directions.

18. In an electric switch, a support, a contact thereon, a carrier, a holder upon the carrier adapted for movement thereon, means adapted to afford a predetermined degree of resistance to movement of the holder, a contact upon the holder adapted when the latter is moved to a predetermined position to engage the first mentioned contact, yieldable means adapted to be conditioned by movement of the carrier to effect movement of the holder thereon when the carrier is moved to a predetermined position in which it is adapted to effect a positive initial movement of the holder, an element connected with the carrier for moving it in opposite directions and manually controlled operating means for said element.

19. In an electric switch, a support, a contact thereon, a carrier, a holder upon the carrier adapted for movement thereon, means adapted to afford a predetermined degree of resistance to movement of the holder to and from circuit closing positions, a contact upon the holder adapted when the latter is moved to a predetermined position to engage the first mentioned contact, means adapted to be conditioned by movement of the carrier to first effect a positive movement thereof to overcome the resisting means therefor and subsequently effect a relatively quick movement of the holder to and from circuit closing positions a spring conditioned by the carrier when moving to circuit closing position adapted to automatically return the carrier to circuit breaking position when released and means for moving the carrier in opposite directions.

20. In an electric switch, a support, a fixed contact thereon, a second contact, a holder for the second contact movable toward and from the fixed contact, yieldable means for resisting movement of the holder from either circuit opening or closing positions, means movable in opposite directions to effect a positive initial movement of the holder from each of said positions and yieldable means actuated by the last mentioned means adapted after initial movement of the holder to effect a relatively quick movement thereof to its different positions.

21. In an electric switch, a support, a fixed contact thereon, a carrier adapted for movement in opposite directions upon the support, a second contact, a holder for the second contact adapted for movement upon the carrier toward and from the fixed contact and arranged for a positive initial movement in opposite directions by the carrier, yieldable means for resisting movement of the holder from either circuit opening or closing positions, yieldable means actuated by the carrier adapted after initial movement of the holder by the latter to effect a relatively quick movement thereof to and from circuit closing positions and means for moving the carrier in opposite directions.

22. In an electric switch, a support, spaced contacts thereon, a carrier reciprocally mounted upon the support, a guide upon the carrier, a second guide upon the carrier, separate sets of followers mounted upon each guide, a spring carried by each follower guide between the followers thereof, stops for the followers of the first mentioned guide, each follower of said first mentioned guide being actuated by movement of the carrier in one direction whereby to compress the spring between said followers on said guide upon movement of the carrier in opposite directions, a holder having a contact thereon for engagement with said spaced contacts in different positions of the holder and having opposite portions forming stops for the followers of the second mentioned guide, means for yieldably resisting movement of the holder against compression of the spring on the second mentioned guide which affords a quick movement of the holder in predetermined positions of the carrier and means for moving the carrier in opposite directions.

23. In an electric switch, a support, spaced contacts thereon, a carrier reciprocally mounted upon the support, a guide upon the carrier, a second guide upon the carrier, a set of followers upon each guide, a spring upon each guide between the followers thereof, stops for the followers of the first mentioned guide permitting inward but limiting outward movement of the followers thereof, a holder upon the other guide having spaced portions forming abutments for the followers thereon to resist compression of the spring between said followers, a contact upon the holder adapted for engagement with said spaced contacts in different positions of the holder, means yieldably resisting movement of the holder upon movement of the carrier in either direction, the carrier being movable to different positions at each of which the last mentioned followers will positively effect initial movement of the holder against the action of the yieldable resisting means therefor and after which the holder will be given the relatively quick movement by the spring compressed by said last mentioned followers and means for reciprocating the carrier.

24. An electric switch comprising a base, contact members thereon, one of which is reversibly mounted, a swingingly mounted manually operable actuator for said reversibly mounted contact, separate swingingly mounted manually operable devices each operatively associated with said actuator and spring means associated with said reversibly mounted contact member arranged to effect a relatively quick movement thereof upon movement of said actuator to either of two predetermined positions.

25. An electric switch comprising a base, contact members thereon, one of which is reversible, a reciprocally mounted holder for the movable contact, yieldable means for resisting movement of the holder in either direction, normally spaced followers engaging oppositely disposed portions of the holder, spring means interposed between said followers for resisting movement of one toward another and a device movable in opposite directions to cause either follower to move the other whereby to effect a positive initial movement of the holder in either direction against the resistance of said yieldable means, said spring means operating after initial movement of the holder to effect a relatively quick movement thereof.

ADAM J. MAY.